Oct. 23, 1928.

E. WILDHABER

METHOD OF HOBBING THREADS

Filed March 22, 1923

INVENTOR
E. Wildhaber
BY Wayne B Wells
ATTORNEY

Oct. 23, 1928.

E. WILDHABER 1,688,768

METHOD OF HOBBING THREADS

Filed March 22, 1923      4 Sheets-Sheet 2

INVENTOR
E. Wildhaber
BY Wayne B Wells
ATTORNEY

Oct. 23, 1928.
E. WILDHABER
METHOD OF HOBBING THREADS
Filed March 22, 1923
1,688,768
4 Sheets-Sheet 3
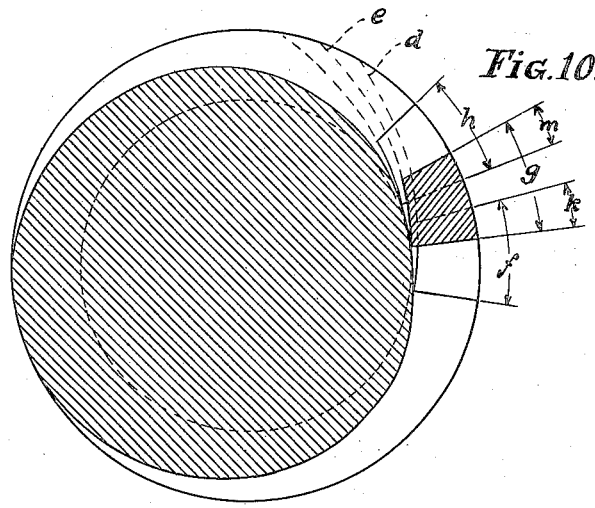
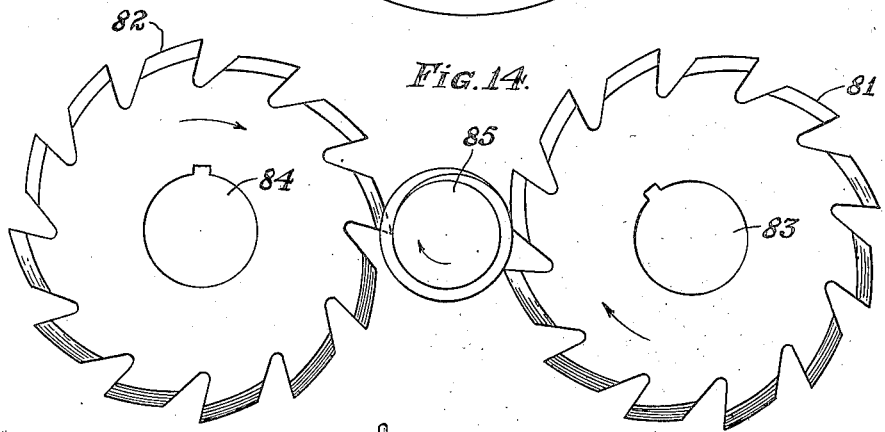
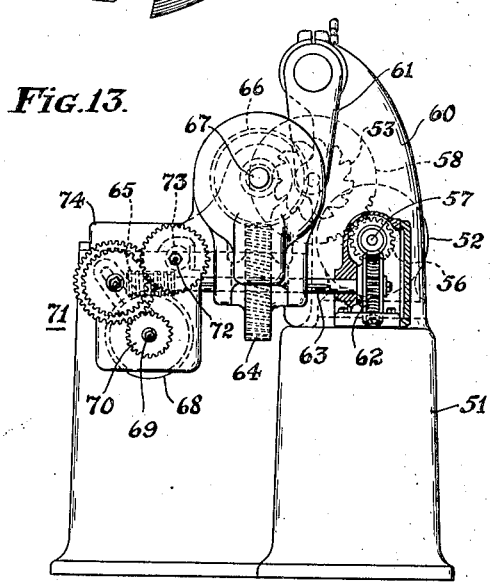
INVENTOR
E. Wildhaber.
BY Wayne B Wells.
ATTORNEY Patented Oct. 23, 1928.

1,688,768

UNITED STATES PATENT OFFICE.

ERNEST WILDHABER, OF BROOKLYN, NEW YORK, ASSIGNOR TO NILES-BEMENT-POND COMPANY, OF NEW YORK, N. Y., A CORPORATION OF NEW JERSEY.

METHOD OF HOBBING THREADS.

Application filed March 22, 1923. Serial No 626,848.

My invention relates to methods of forming screw threads and particularly to methods of hobbing screw threads.

One object of my invention is to provide a method of hobbing screw threads that shall consist in effecting radial feeding movement between a hob and a blank, while maintaining the longitudinal positions of the hob and blank unchanged, and in effecting relative angular advancing movement between the hob and the blank in timed relation to the feeding movement.

Another object of my invention is to provide a method of hobbing screw threads that shall consist in rotating a hob and a blank in engagement with each other, in effecting radial feeding movement of the blank with respect to the hob, while maintaining the longitudinal positions of the hob and blank unchanged with respect to each other, and in effecting an angular advance of the blank with respect to the hob in timed relation to the feeding movement.

Another object of my invention is to provide a method of the above indicated character for hobbing threads that shall consist in effecting feeding movement of the hob and blank toward each other for cutting one side of a blank thread and in effecting feeding movement of the hob and blank away from each other for cutting the opposite side of the blank thread.

A further object of my invention is to provide a method of hobbing screw threads that shall consist in rotating a hob and a blank in engagement with each other, in effecting radial feeding movement of a blank toward the hob for cutting one side of the blank thread, in effecting feeding movement of the blank away from the hob for cutting the opposite side of the blank thread, the longitudinal positions of the hob and blank being maintained unchanged with respect to each other, and in effecting angular advancing movements of the blank with respect to the hob in timed relation to the feeding movement.

Methods are known for hobbing a thread on a blank without effecting longitudinal movement between the blank and the hob but the thread thus produced has flats formed thereon. In one method the hob and the blank are rotated in engagement with each other on parallel axes and at a speed ratio corresponding to the number of threads to be cut on the blank and the number of threads on the hob. A radial feeding movement is effected between the hob and the blank for simultaneously cutting both sides of the blank thread. The finishing cut in such method is only effected at the end of the feeding movement. However, such method is objectionable inasmuch as the flats are formed on the blank thread. The number of flats formed on the thread varies in accordance with the number of flutes on the hob used to cut the blank thread.

A number of methods have been proposed for eliminating the flats which are formed on the blank thread by the above mentioned method. However, in most of the proposed methods it is esesntial to provide means for effecting a longitudinal feeding movement of the blank with respect to the hob.

In forming a thread on a blank in accordance with my method, it is unnecessary to effect any longitudinal feeding movement of the blank with respect to the hob and moreover no flats are formed on the blank thread. In carrying out my method, the blank and the hob are rotated on parallel axes in engagement with each other. Preferably, the blank is fed toward the hob by a suitable cam mechanism. However, it is to be understood the blank may be held stationary and the hob may be fed toward the blank. The blank and the hob rotate at a speed ratio which is slightly different from the ratio of the thread to be formed on the blank and the thread on the hob. Preferably, the blank is rotated at a speed slightly higher than the speed of the hob in order to effect an angular advance of the blank with respect to the hob. The feeding movement of the blank is maintained in timed relation to the angular advance of the blank with respect to the hob. Preferably, the blank is fed toward the hob for cutting one side of the blank thread and is withdrawn from the hob for cutting the opposite side of the blank thread. In such method no axial or longitudinal movement whatsoever of the blank with respect to the hob is effected, and moreover, a finishing cut is effected during the complete feeding movement. It is of course, apparent that if so desired, a roughing cut may be first effected before starting on the finishing cut for forming the blank thread.

In the accompanying drawings:

Fig. 10 is a diagrammatic view of a section taken perpendicularly to the axis of a screw thread formed by taking a separate roughing cut.

Fig. 13 is an end elevational view of the machine shown in Fig. 11.

Fig. 14 is a diagrammatic view showing the forming of a screw thread by means of two hobs.

In Figs. 1, 2, 3 and 4 of the drawings, the forming of a screw thread in accordance with my invention is diagrammatically illustrated. As heretofore set forth the hob and the blank are rotated in the same direction while in engagement with each other. The blank and the hob are fed radially towards each other and away from each other but no axial movement of the hob and the blank with respect to each other is effected during the cutting operation. The blank and the hob are rotated at speeds corresponding to the number of threads on the hob and the number of threads to be cut on the blank. Thus, if the same number of threads are to be cut on the blank as are on the hob then the blank and hob will be rotated at very near the same speeds. Preferably, the blank is fed toward and away from the hob but if so desired the feeding movement may be effected by the hob. The blank is preferably angularly advanced with respect to the hob but if so desired, such movement may be effected by the hob.

Figure 1:
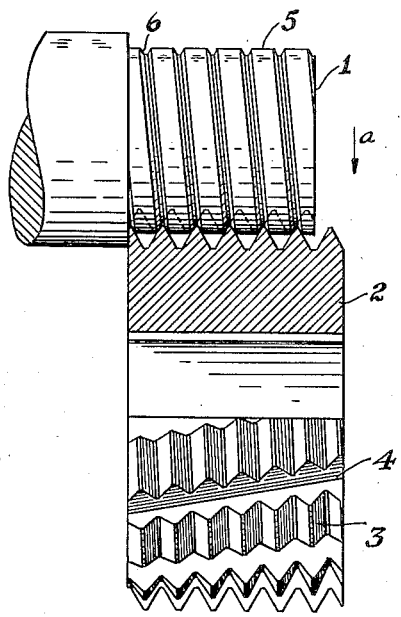
Figure 1 is a diagrammatic view illustrating the position of the hob and the blank at the start of the cutting operation.

In Fig. 1 of the drawings a blank 1 is shown in engagement with a hob 2. The blank 1 and the hob 2 are each assumed to be rotating in a clockwise direction, when viewed from the right of Fig. 1. The hob 2 is provided with teeth 3 which are formed by means of flutes 4. In many methods of hobbing screw threads, the number of flutes on the hob is of importance inasmuch as flats are formed on the screw thread in accordance with the number of flutes on the hob. In cutting a screw thread in accordance with my invention, no flats are formed on the blank thread and accordingly the number of flutes on the hob is of no special importance. The hob is shown in position for starting a right hand thread 5 on the blank 1. It will be noted the hob has started a finishing cut on the upper side 6 of the thread 5. The blank 1 is fed in the direction of the arrow $a$ while, at the same time, the blank is angularly advanced with respect to the hob 2.

Figure 2:
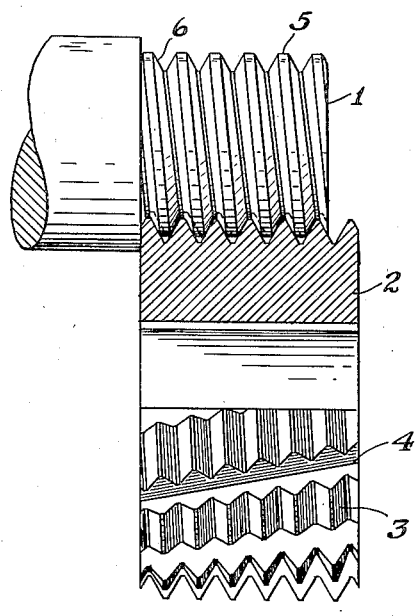
Fig. 2 is a diagrammatic view showing the position of the hob and the blank after they have been moved toward each other a predetermined distance.

The feeding movement and also the angular advancing movement cause the hob and blank to assume positions such as illustrated in Fig. 2 of the drawings. For convenience in illustrating the relative positions of the blank and the hob, the blank 1 is shown in exactly the same position in Figs. 1, 2, 3 and 4 of the drawings whereas the hob 2 is shown in different angular positions with respect to the blank. In Fig. 2 the upper side 6 of the blank thread 5 is shown very nearly completed. The dotted profile of the thread shown in Figs. 1 and 2 indicates the outline of the completed thread. In comparing Figs. 1 and 2 it is apparent the cut being taken by the hob follows the dotted profile. It will be noted the relative angular advancing movement between the hob and the blank produce substantially the same effect as if the hob were moved axially along the blank while the speed of the hob and the blank were maintained substantially constant.

Figure 3:
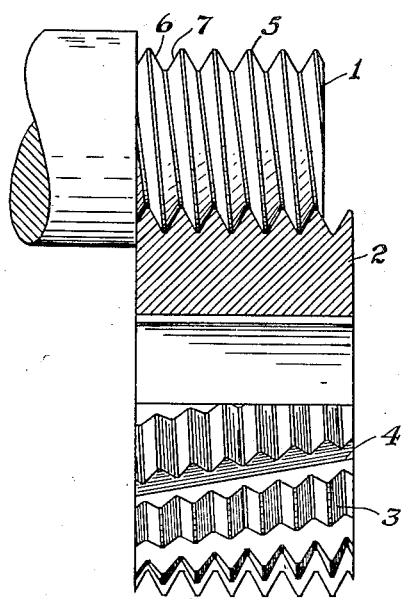
Fig. 3 shows the position of the hob and the blank when one side of the blank thread is completed.
Figure 4:
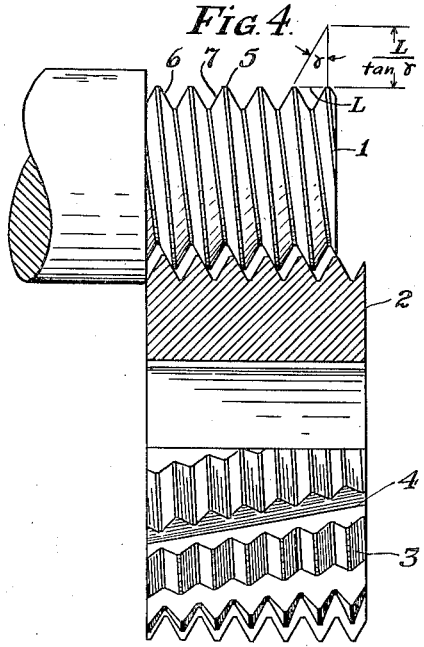
Fig. 4 is a diagrammatic view showing the position of the hob and the blank after they have been moved away from each other a predetermined distance.

Referring to Fig. 3 of the drawings, the hob 2 is shown in position to complete the upper side 6 of the thread 5. The blank 1 is then fed away from the hob 2 to finish the lower side 7 of the blank thread. An intermediate position of the hob blank during the movement of such members away from each other is indicated in Fig. 4 of the drawings. In the above method it will be noted the movement of the hob and blank towards each other cuts one side of the blank thread whereas the movement of the hob and blank away from each other cuts the opposite side of the blank thread. Moreover, it will be noted the finishing cut is being taken on the blank thread at all times during the feeding movement whereas in many of the processes now in use for hobbing threads, the finishing cut is only taken when the hob is in the innermost position. As heretofore set forth, the angular advancing movement of the blank must be effected in timed relation to the feeding movement.

In forming a screw thread on a blank in accordance with my invention, it is preferable to have the blank and hob connected together by a gearing system having a fixed ratio. Thus, the blank is angularly advanced with respect to the hob at a constant rate. In other words, it may be stated that the blank rotates at a slightly greater speed than the hob. If the blank and the hob are fixedly connected together by a gearing system, as above set forth, then it is preferable to provide a uniform motion cam for effecting the feeding movement of the blank with respect to the hob.

Figure 5:
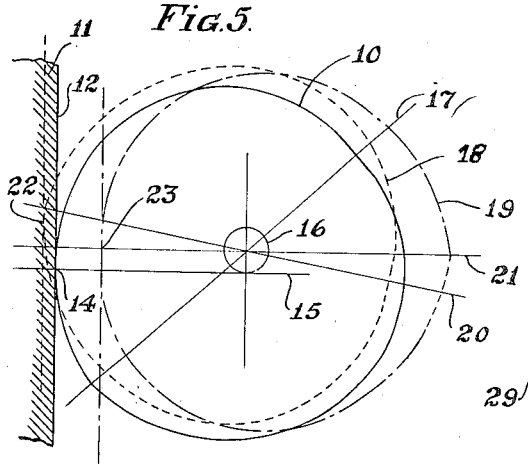
Fig. 5 is a diagrammatic view showing a cam for effecting relative movement between the hob and the blank.

Referring to Fig. 5 of the drawings, a cam 10 is shown for producing a uniform feeding movement of the blank with respect to the hob. The shape of the cam 10 shown in Fig. 5 is somewhat exaggerated in order to more clearly indicate the motion which is produced by it. The cam 10 is assumed to engage the flat surface 12 of a plate 11. Inasmuch as the cam 10 engages a flat surface and produces uniform movement of such surface, the shape of the cam must be an involute. The cam, in the position shown, is assumed to touch the flat surface 12 at a point 14 which is located on a line of action 15. The line of action 15 is necessarily perpendicular to the surface 12 and is tangent to the base circle 16 of the involute. In the case illustrated the movement produced by the cam per revolution thereof is equal to the circumference of the base circle 16 and, consequently, the movement produced per half revolution is one-half of the circumference of the base circle 16.

When reference was made to Figs. 1 to 4, inclusive, it was stated that the hob and blank must be moved toward each other in order to cut one side of the blank thread and then must be moved away from each other in order to cut the other side of the thread. Consequently, the cam 10 must not only produce a uniform movement of the blank and hob toward each other but also must insure the uniform movement of the hob and the blank away from each other. The uniform movement may be produced by providing two symmetrical involutes on the surface of the cam.

In Fig. 5 of the drawings, the axis of symmetry for the involutes is indicated by the reference character 17. A second position of the cam 10 is indicated by the dotted lines 18 and the third position of the cam 10 is indicated by the dot and dash lines 19. In the second position of the cam, the line of symmetry is indicated by the reference character 20 and in the third position of the cam member the axis of symmetry is indicated by the reference character 21. In the second position of the cam member, engagement is effected with the flat surface 12 at a point 22 and in the third position of the cam member, engagement is effected with the surface 12 at a point 23. In the second position of the cam member, the reversal of the feeding movement is starting and the blank is being moved uniformly away from the hob. In the third position of the cam member, the hob and the blank are moved to the extreme position away from each other.

Figure 6:
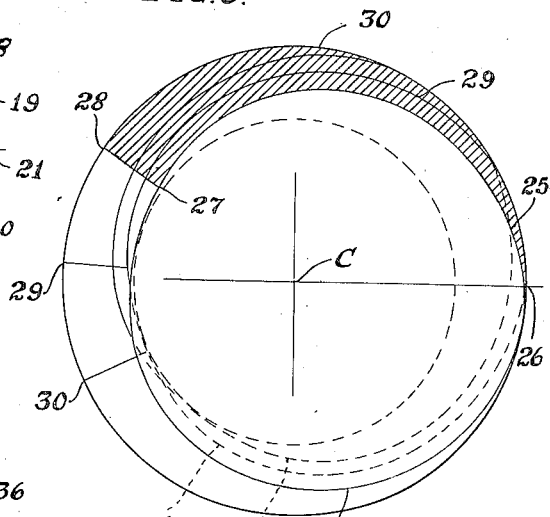
Fig. 6 is a diagrammatic view showing a section taken perpendicularly to the axis of a screw thread formed in accordance with my invention.

In Fig. 6 of the drawings, a section is illustrated, which is taken perpendicularly to the axis of a screw thread formed in accordance with my invention. The section plane which is taken at a right angle to the axis C of the screw thread intersects one side of the screw surface in a spiral 25. Such plane intersects the screw surface on the other side of the screw surface in a symmetrical spiral 25'. Such spirals are necessarily Archimedic spirals. In the present case, when a theoretical screw surface is being examined, the spiral 25 or the spiral 25' may be considered as the path of the tip of a hob tooth on the screw surface. As set forth in describing Figs. 1, 2, 3 and 4 of the drawings, the blank is continuously and angularly advanced with respect to the hob during the feeding movement between the hob and the blank. Consequently, the hob teeth are continuously in contact with the final screw surface during the cutting action. Thus, it is apparent that the angular advance and the feeding movement must be effected in timed relation if the hob is to cut along the final screw surface from the initial cutting position.

It is assumed the lead of the screw surface being considered is equal to L and that the angle of inclination the screw profile makes in an axial sectional plane is equal to $\delta$, consequently, the movement in or out of the blank and hob with respect to each other per revolution of the screw surface must be in accordance with $\frac{L}{\tan \delta}$. Either the hob or the blank must be fed in and out at the same rate of $\frac{L}{\tan \delta}$ per advance of the blank of a full revolution. The angle $\delta$ and the lead L have been diagrammatically illustrated in Fig. 4 of the drawings.

The cutting edge of the hob, which was considered to cut along the spiral 25 at the tip thereof, covers all the screw surface outside of the spiral 25 from a point 26 to a point 27. The limit of the spiral and of the cutting action being considered is a line 27—28 which corresponds to the cut of the complete cutting edge when the hob and the blank are in the position illustrated in Fig. 3 of the drawings. The portion of the screw surface, which is covered by a single cutting edge of a hob is the area 26, 27, 28 shown in section lines in Fig. 6 of the drawings. A similar area is covered by the other side of the cutting tooth when the hob and the blank are gradually moved away from each other, as indicated in Fig. 4 of the drawings.

The tips of succeeding teeth on the hob will cut along other spirals 29 and 30, which are indicated in Fig. 6 of the drawings. The symmetrical spirals corresponding to the spirals 29 and 30 are indicated by the reference characters 29' and 30'. The cutting edges of the hob teeth will cover equal areas which overlap each other to a great extent as indicated in Fig. 6 of the drawings. The angular distance of two adjacent spirals depends on the number of flutes on the hob.

The using of uniform motion cams of the above described type is impracticable in some respects inasmuch as the operation is delayed somewhat. However, it is possible to vary the rate of feed between the blank and the hob and lower the time of cutting a thread on the blank. Thus, when the hob and blank are moved towards each other such movement may be relatively rapid for a certain portion of the cut. After the roughing cut, the motion may be made uniform in accordance with the angular advance of the blank in order to effect a finishing cut. During the movement of the blank and the hob away from each other, the movement is first slow and uniform in accordance with the angular advance of the blank and later such movement is relatively rapid to quickly separate the blank and the hob. Accordingly, it is preferable to provide a cam member which varies the rate of feeding between the blank and the hob. However, a sufficient uniform motion must be provided in order to over-lap the areas cut by the various hob teeth and thus obtain a smooth screw surface.

Figure 9:
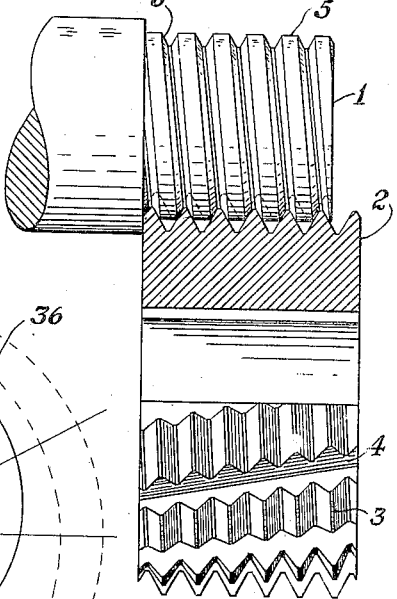
Fig. 9 is a diagrammatic view illustrating the taking of a separate roughing cut.

In Fig. 9, the same reference characters have been used as in Figs. 1 to 4, inclusive, for designating the various parts of the hob and the blank. The blank 1 and the hob 2 in Fig. 9 are assumed to be moved towards each other at a rate above the uniform motion rate for effecting a rapid roughing cut. The dotted outline on the blank 1, as in Figs. 1 and 2, indicates the profile of the finished screw surface. It will be noted in such figure that the teeth 3 of the hob are not in engagement with the profile indicated by the dotted outline and no finishing cut will be obtained until the hob teeth engage such profile. Consequently, the hob and the blank may be fed rapidly towards each other until the hob teeth cut along the profile indicated by the dotted line. When the hob cuts along the indicated profile line then the feed must be at a uniform rate and in timed relation to the angular advance of the blank.

Referring to Fig. 10 of the drawings, a section is assumed to be taken perpendicularly to the axis of a screw thread which is formed in accordance with the method indicated in Fig. 9 of the drawings. The screw surface shown in Fig. 10 is similar to the screw surface shown in Fig. 6. However, the various spirals which are formed by the various hob teeth do not over-lap to the extent that the spirals shown in Fig. 6 over-lap. Two spirals $e$ and $d$ are shown in Fig. 10 of the drawings. The spiral $d$ effects a finishing cut through the distance $f$ and the spiral $e$ effects a finishing cut through the distance $g$. The two spirals $e$ and $d$ over-lap for a distance $k$. A third spiral would effect a finishing cut through the distance $h$ and would over-lap the spiral $e$ through a distance $m$. The spirals, which are formed by the hob teeth during the withdrawing of the hob and blank from engagement with each other, are symmetrical to the spirals indicated in Fig. 10. Thus, it is possible to start cutting and effect a roughing cut at a relatively coarse feed and to effect a finishing cut at a much finer feed.

Figure 7:
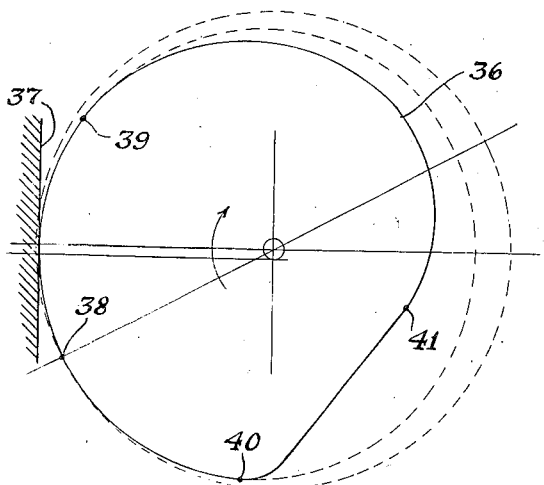
Figs. 7 and 8 are diagrammatic views of cam members for relatively moving the hob and the blank to effect a separate roughing cut before taking the finishing cut.
Figure 8:
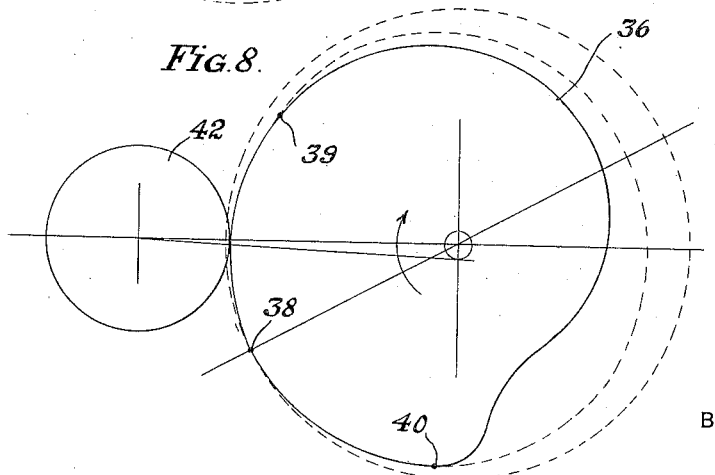

In Figs. 7 and 8 of the drawings, two cam members are illustrated for producing the motion necessary to effect first a roughing cut and later a finishing cut. In Fig. 7, a cam member 36 is assumed to engage a flat surface 37 in the same manner as the cam member 10 in Fig. 5 of the drawings engages the flat surface 12. The cam member 36 is assumed to rotate in a clockwise direction, as indicated by the arrow, and is provided with two symmetrical uniform motion spirals. Such spirals in the present case are involutes. One of the involutes extends from a point 38 to a point 39 and the other involute extends from the point 38 to a point 40. From the time the point 39 engages the surface 37 to the time the point 38 engages the surface 37, the blank is fed uniformly towards the hob and in timed relation with the angular advance of the blank with respect to the hob. From the time the point 38 engages the flat surface 37 to the time the point 40 engages the flat surface, the blank is uniformly withdrawn from engagement with the hob in timed relation to the angular advance of the blank with respect to the hob. After the point 40 engages the flat surface until point 41 engages said surface, the blank is withdrawn from engagement with the hob at a relatively rapid rate. From the time the point 41 engages the flat surface until the point 39 engages such surface, the blank is moved towards the hob first at a relatively rapid rate and later at a rate approaching the uniform rate.

If so desired, the flat surface 37 may be replaced by a roller 42, as indicated in Fig. 8 of the drawings. The parts of the cam, which engage the roller 42, have been indicated by the same reference characters as were used in describing the cam shown in Fig. 7 of the drawings. When reference is made to Figs. 11, 12 and 13 of the drawings, a further description will be given of the operation of such cam member.

The hobs, which are used in cutting screw threads in accordance with my invention, may have straight or spiral flutes. However, spiral flutes are preferred and preferably, the teeth of the hob are ground. The hob may have more than one thread on it and cut more than one thread on the blank.

Figure 11:
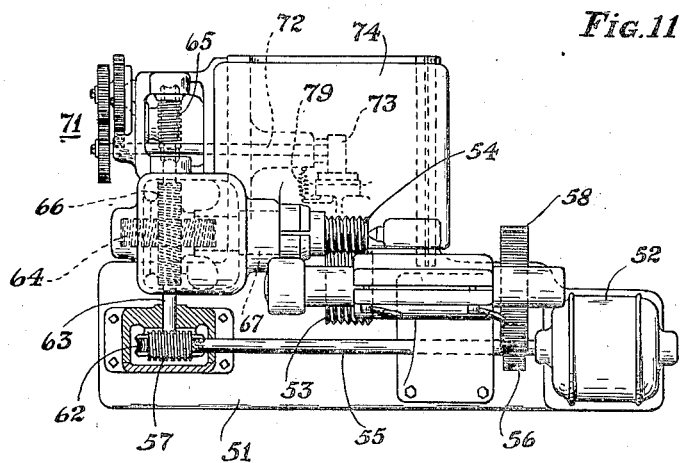
Fig. 11 is a diagrammatic plan view of a machine for forming a screw thread in accordance with my invention.
Figure 12:
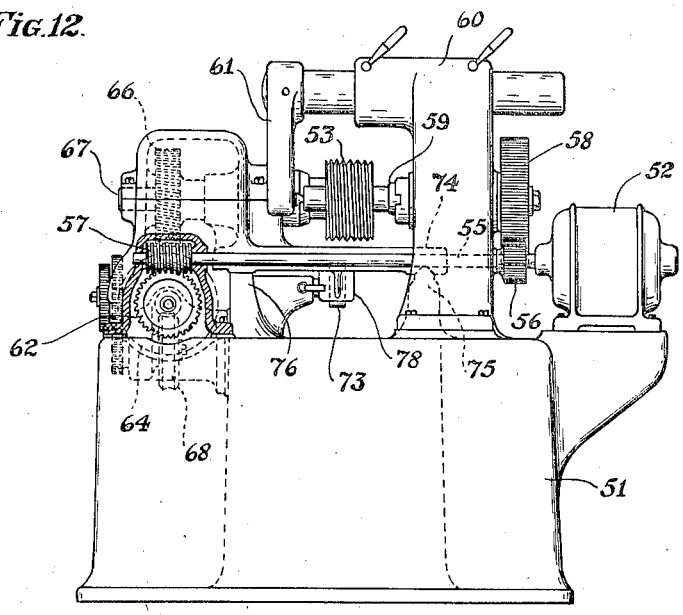
Fig. 12 is a front elevational view of the machine shown in Fig. 11.

In Figs. 11, 12 and 13 a machine is illustrated which is adapted to cut a screw thread in accordance with my invention. The machine comprises a base 51 carrying a motor 52 for operating a hob 53 and a blank 54. The armature shaft of the motor 52 is directly connected to a shaft 55 which carries a pinion 56 and a worm 57. The pinion 56 meshes with a gear wheel 58 which is mounted on a spindle 59. The spindle 59 carries the hob 53 and is supported in an upright 60. The upright 60 is suitably mounted on the base 51 and carries an adjustable overhanging arm 61 for supporting one end of the spindle 59.

The worm 57 on the shaft 55 meshes with a worm wheel 62 which is fixedly mounted on a shaft 63. The shaft 63 carries a spiral gear wheel 64 and a worm 65. The spiral gear wheel 64 meshes with a second spiral gear wheel 66 which is mounted on a spindle 67. The spindle 67 is mounted parallel with the spindle 59 and carries the blank 54. The worm 65 meshes with a worm wheel 68 which is mounted on a short shaft 69. The shaft 69 carries a pinion 70 which is a part of a set of change gears 71. The change gears 71 connect the shaft 69 with a cam shaft 72. The cam shaft 72 carries a cam member 73 of the type heretofore described and which is adapted to effect feeding movement of the blank 54 with respect to the hob 53. A slide 74, which is mounted on ways 75 and 76 on the base 51, carries the blank 54, the spindle 67 and the spiral gear wheel 64. The spiral gear wheel 64 is splined to and slidably mounted on the shaft 63 in order to permit it to move freely with the slide 74. An adjustable lug 78, which projects from the bottom of the slide 74, is adapted to be engaged by the cam member 73. A suitable spring member 79 is connected between the base 51 and the slide 74 for holding the projecting lug 78 in engagement with the cam member 73.

Although the blank 54 is shown mounted on the slide and the hob 53 is mounted on the base, it is to be understood that the hob 53 may be moved relative to the blank 54 if so desired. The blank and the hob are rotated in the same direction and accordingly the master hob must be provided with threads of the same hand as the threads which are to be cut on the blank. The gearing connection of the hob and blank to the motor 52 is such that the blank rotates at a slightly faster rate than the hob. Such advance movement of the blank with respect to the hob is effected in order to prevent any flats being formed on the blank thread.

When cutting screw threads of different lead, the speed ratio of the two spindles 59 and 67 is preferably maintained constant and any change necessary is effected by means of the change gears 71 or the cam member 73. It is possible to maintain the cam member 73 constant for screw threads of different lead and merely to vary the change gears. However, if no change is made in the cam member, the forming of screw threads with a smaller lead is necessarily somewhat slower.

It is possible to cut the two sides of the blank thread by means of two hobs in one movement if so desired. Referring to Fig. 14 of the drawings, two hobs 81 and 92 mounted on shafts 83 and 84 are shown in engagement with a blank 85. The operation of the two hobs is similar to the operation of a single hob as heretofore set forth. However, one hob is set to cut one side of a blank thread and the other hob is set to cut the other side of the blank thread. In such case, the thread is formed by one inward feeding movement of the two hobs.

It will be understood that such changes and modifications may be made in my invention as fall within the limits of the appended claims.

What I claim is:

1. The method of forming a thread on a blank, which consists in rotating a hob and a blank in engagement with each other, in effecting an angular advance of the blank with respect to the hob, and in effecting radial feeding movement between the hob and the blank, the finishing of the hob thread being effected during a large part of the feeding movement, the longitudinal positions of the hob and the blank being maintained unchanged with respect to each other and the feeding movement being effected in timed relation to the angular advance of the blank.

2. The method of forming a thread on a blank, which consists in rotating a hob and a blank in engagement with each other, in effecting a constant slight angular advance of the blank with respect to the hob, and in radially feeding the blank toward the hob for cutting one side of the blank thread, and in moving the blank away from the hob for cutting the opposite side of the hob thread, said movement of the blank toward and away from the hob being in timed relation to the advance of the blank relative to the hob, the finishing of the blank thread being effected during the large part of the feeding movements.

3. The method of forming a thread on a blank, which consists in rotating a hob and a blank in engagement with each other, in effecting an angular advance of the blank with respect to the hob, and in radially feeding the blank toward the hob for cutting one side of the blank thread and for feeding the blank away from the hob for cutting the opposite side of the hob thread, the finishing of the blank thread being effected during the large part of the feeding movements, the longitudinal positions of the hob and the blank being maintained unchanged with respect to each other and the feeding movements being effected in timed relation to the angular advance of the blank.

4. The method of forming a thread on a blank, which consists in rotating a hob and a blank in engagement with each other and in the same direction, in maintaining the speed ratio between the hob and the blank slightly different from the ratio between the number of threads on the hob and the number of threads to be cut on the blank, and in effecting transverse feeding movement between the hob and the blank in timed relation to the blank and hob rotation while maintaining the longitudinal positions of the hob and the blank unchanged.

5. The method of forming a thread on a blank, which consists in rotating a hob in engagement with a blank, in maintaining the speed ratio between the hob and the blank slightly different from the ratio between the number of threads on the hob and the number of threads to be formed on the blank, and in effecting radial feeding movement between the hob and the blank in timed relation to the hob and blank rotation while maintaining the longitudinal positions of the hob and the blank unchanged.

6. The method of forming a thread on a blank, which consists in rotating a hob in engagement with a blank, the hob having a single thread formed on it, in maintaining the speed ratio between the hob and the blank slightly different from a ratio of one to one, and in effecting radial feeding movement, between the hob and the blank in timed relation to the hob and blank rotation while maintaining the longitudinal positions of the hob and the blank unchanged with respect to each other.

7. The method of forming a thread on a blank, which consists in rotating a hob in engagement with a blank, the hob and the blank rotating in the same direction at slightly different speeds, and in effecting transverse feeding movements between the hob and the blank in timed relation to the hob and blank rotation while maintaining the longitudinal positions of the hob and the blank unchanged.

8. The method of forming a thread on a blank, which consists in rotating a hob in engagement with a blank, the hob and the blank rotating in the same direction at slightly different speeds, and in effecting radial feeding movement between the hob and the blank in timed relation to the hob and blank rotation while maintaining the longitudinal positions of the hob and the blank unchanged.

9. The method of forming a thread on a blank, which consists in rotating a hob and a blank in engagement with each other, in effecting an angular advance of the blank with respect to the hob, and in radially feeding the blank and the hob with respect to each other while maintaining the longitudinal positions of the hob and the blank unchanged with respect to each other, the radial feed being effected in accordance with the lead of the thread being formed and the tangent of the profile inclination of such thread.

In testimony whereof, I hereto affix my signature.

ERNEST WILDHABER.